United States Patent
Watson

(10) Patent No.: US 9,445,040 B2
(45) Date of Patent: Sep. 13, 2016

(54) METHOD AND SYSTEM OF REAL TIME DELIVERY OF AROMA

(71) Applicant: Ricardo Roosevelt Watson, Missouri City, TX (US)

(72) Inventor: Ricardo Roosevelt Watson, Missouri City, TX (US)

( * ) Notice: Subject to any disclaimer, the term of this patent is extended or adjusted under 35 U.S.C. 154(b) by 0 days.

(21) Appl. No.: 14/174,667

(22) Filed: Feb. 6, 2014

(65) Prior Publication Data

US 2015/0222846 A1    Aug. 6, 2015

(51) Int. Cl.
*H04N 5/765* (2006.01)
*H04N 9/82* (2006.01)

(52) U.S. Cl.
CPC ............ *H04N 5/765* (2013.01); *H04N 9/8205* (2013.01)

(58) Field of Classification Search
None
See application file for complete search history.

(56) References Cited

U.S. PATENT DOCUMENTS

| | | |
|---|---|---|
| 2,540,144 A | 2/1951 | Stern |
| 2,813,452 A | 11/1957 | Laube |
| 3,795,438 A | 3/1974 | Westenholz et al. |
| 5,398,070 A * | 3/1995 | Lee ................................ 348/553 |
| 5,724,256 A * | 3/1998 | Lee et al. ...................... 700/285 |
| 5,832,320 A | 11/1998 | Witteck |
| 5,949,522 A | 9/1999 | Manne |
| 6,024,783 A | 2/2000 | Budman |
| 6,239,857 B1 | 5/2001 | Witteck |
| 6,241,944 B1 | 6/2001 | Budman |
| 6,338,818 B2 | 1/2002 | Budman |
| 6,536,746 B2 | 3/2003 | Watkins |
| 6,542,442 B2 | 4/2003 | Kaslon |
| 6,556,272 B1 | 4/2003 | Du |
| 6,602,475 B1 | 8/2003 | Chiao |
| 6,654,664 B1 * | 11/2003 | Chiao ..................... A61L 9/035 352/85 |
| 6,744,488 B2 | 6/2004 | Schermerhorn |
| 6,859,569 B2 | 2/2005 | Ishibashi et al. |
| 7,347,815 B2 | 3/2008 | Serbanescu |
| 2005/0216339 A1 | 9/2005 | Brazell et al. |
| 2006/0018787 A1 | 1/2006 | Guo |
| 2006/0146126 A1* | 7/2006 | Guo ........................ A61L 9/12 348/61 |
| 2009/0147104 A1* | 6/2009 | Wang ....................... 348/231.99 |
| 2010/0109918 A1* | 5/2010 | Liebermann .................... 341/21 |
| 2014/0099729 A1* | 4/2014 | Mershin et al. .............. 436/149 |

* cited by examiner

*Primary Examiner* — Omar S Parra
(74) *Attorney, Agent, or Firm* — Delphine M. James

(57) ABSTRACT

The present invention is a device that provides aroma sensory information while viewing a program from a multimedia device. The aroma signals are merged in real-time with the video and sound signals into a novel encoded digital stream. The aroma scents are stored in the device and are activated by the novel digital stream broadcast signal. Once activated, the scents are dispersed into the viewing room.

9 Claims, 11 Drawing Sheets

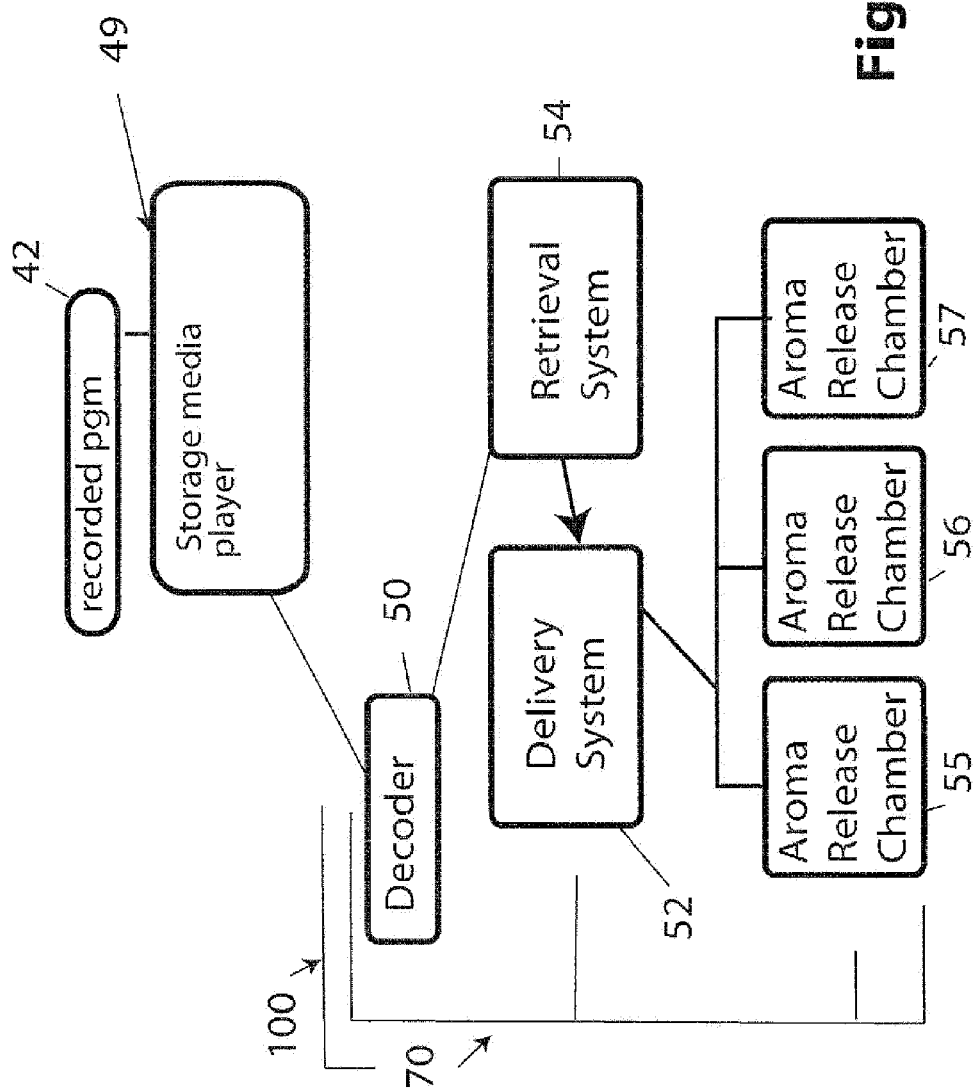

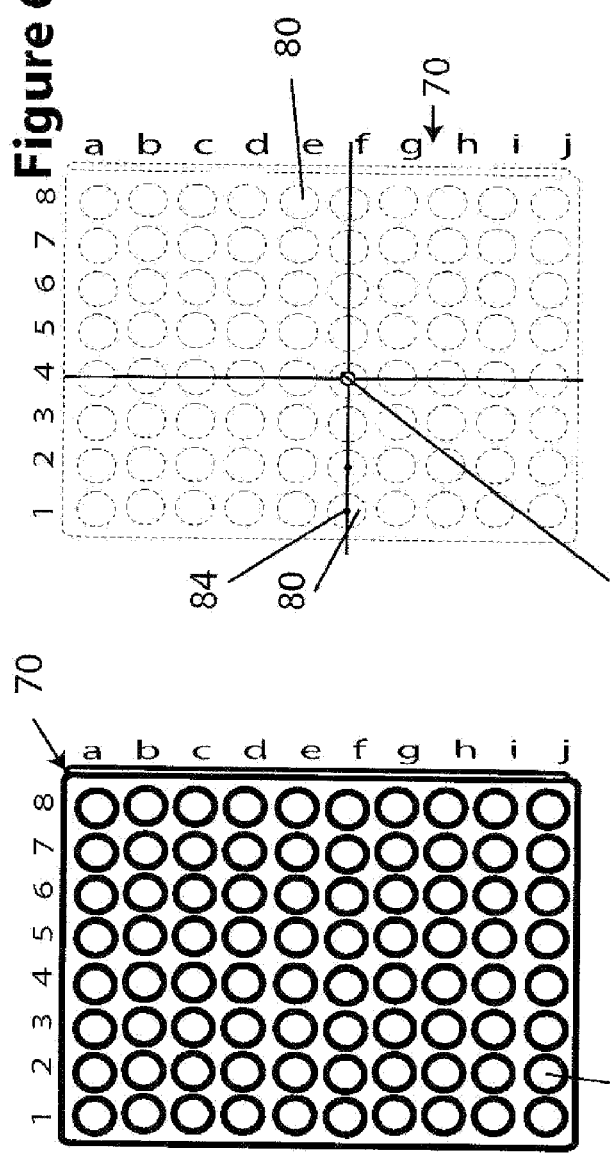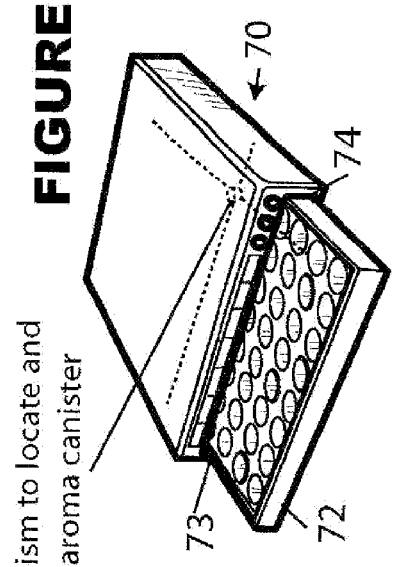

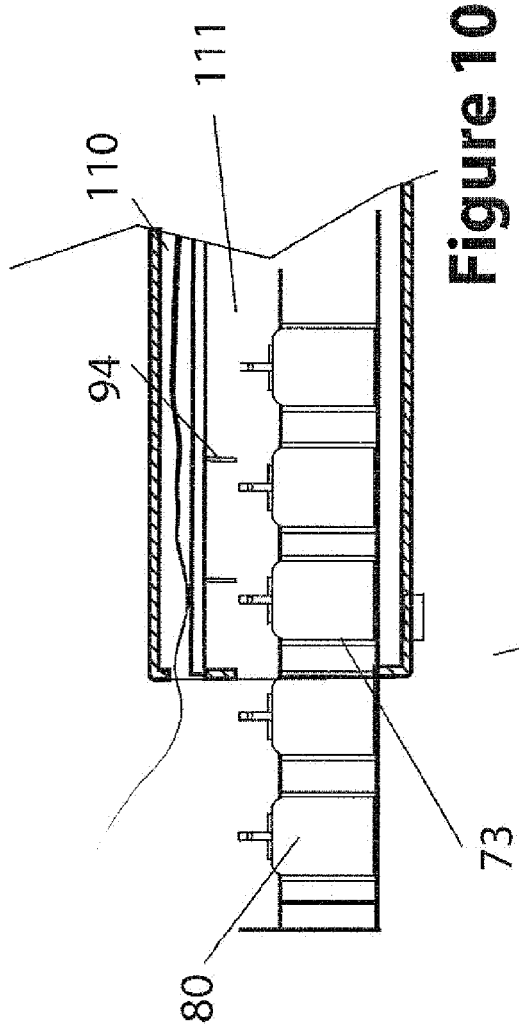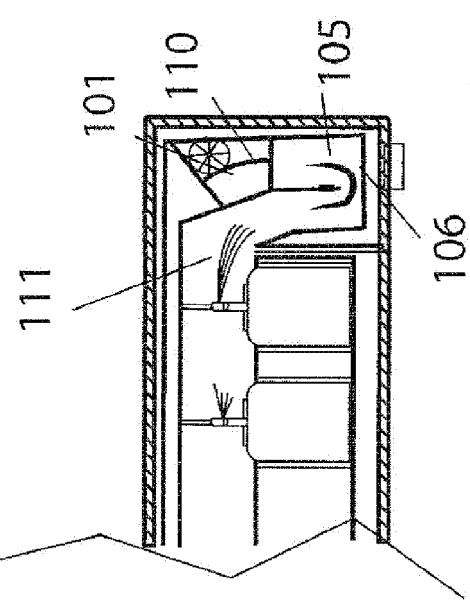

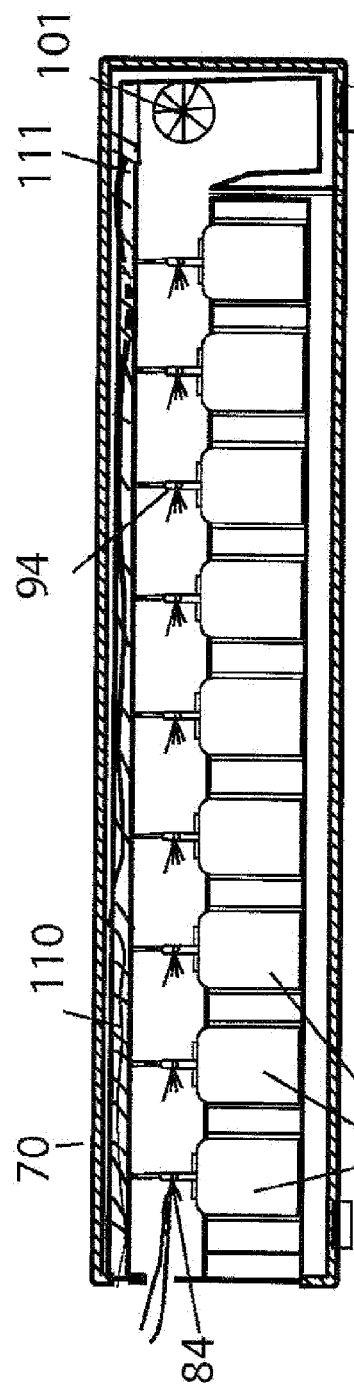
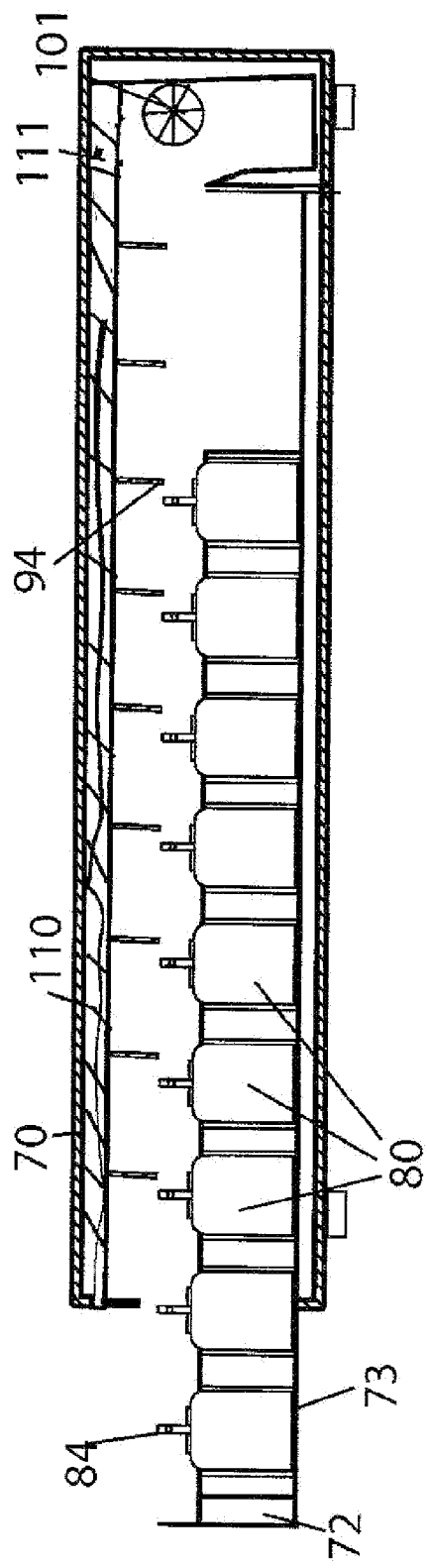

METHOD AND SYSTEM OF REAL TIME DELIVERY OF AROMA

This patent claims the benefit of application Ser. No. 13/937,093

FIELD OF THE INVENTION

The present invention is in the field of multimedia devices. It provides for the delivery of aroma sensory information to a user of a multimedia device including but not limited to TV, monitors, computers, cell phones, or gaming consoles.

BACKGROUND

Currently, multimedia devices such as television can transmit visual and audio sensory information to a user. Since the 1960s, the concept of transmitting aroma sensory information with the images has been investigated within theme parks. However, the difficulty of transmitting the vast amounts of scents that accompany a film has slowed the progress of such technology. The present invention provides a method to emit scents in real time to a viewer of a broadcasted or recorded program.

SUMMARY

The present invention provides a device and method for local delivery of stored aroma sensory information to the viewer of a program through a multimedia device. The device comprises a housing unit that contains a plurality of scents that are emitted in real time as a viewer watches a broadcasted or pre-recorded program. The recording of the emitted scents to be dispersed are integrated into the video filming process. When the audio and visual signals are transmitted, the aroma signals are incorporated into the broadcast signal. The signal is received by a converter which delivers the signal to a retrieval system that releases the scent. The plurality of scents are stored in an aroma chamber. The housing unit is in electronic communication with the multi-media so that it can receive electronic signals from the converter.

BRIEF DESCRIPTION OF THE DRAWINGS

The features of the present invention will best be understood from a detailed description of the invention and a preferred embodiment thereof selected for the purposes of illustration and shown in the accompanying drawings in which.

FIG. 2a is a block diagram of the present invention using a recorded media player.

FIG. 6 is a top view of the aroma chambers.

FIG. 6a is a top view of the actuating mechanism of the aroma scent unit.

FIG. 6b is a perspective view of an opened aroma scent unit.

FIG. 10 is a cross-sectional view of an aroma within the chamber.

FIG. 11 is a cross-sectional view illustrating the dispensing of the aroma.

FIGS. 12 and 12a represent an alternative embodiment of the aroma control unit.

DETAILED DESCRIPTION OF THE INVENTION

Figure 1:
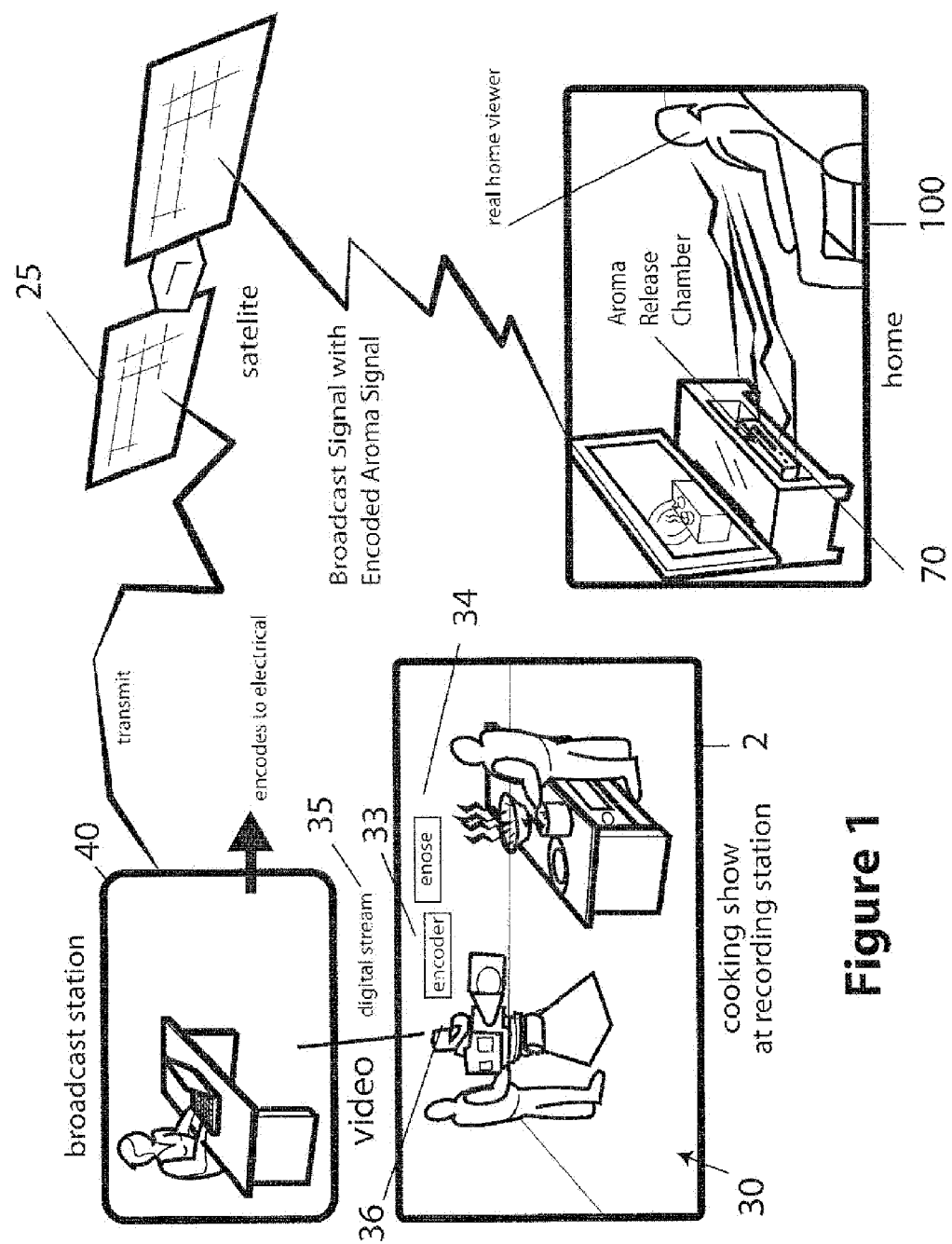
FIG. 1 is a perspective view of the method of the present invention.

The features and advantages of the present invention are illustrated in detail in the accompanying drawings, wherein like reference numerals refer to like elements throughout the drawings.

Figure 1A:
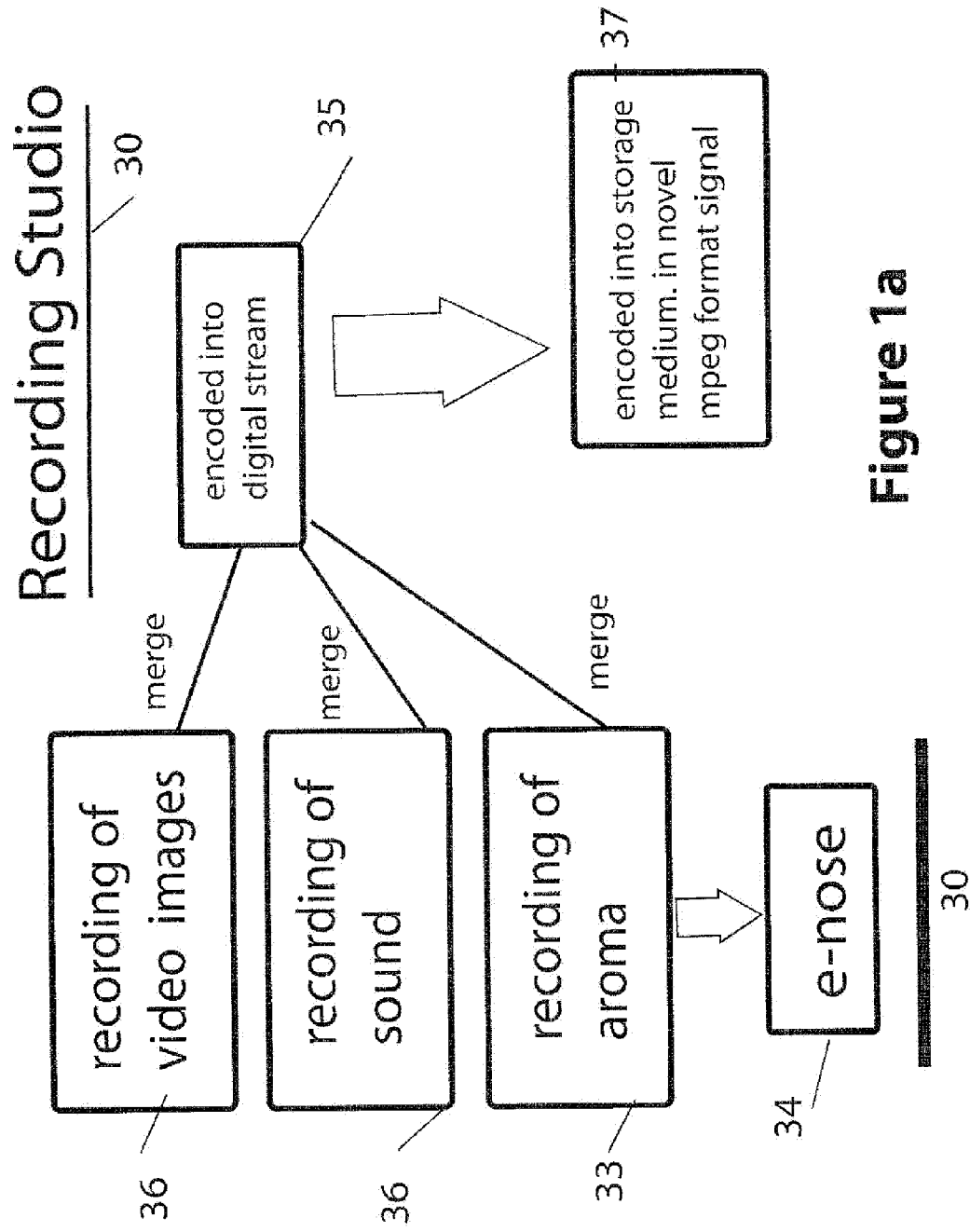
FIG. 1a is a block diagram of the recording studio.

Referring to FIGS. 1 and 1a there is an illustration of one embodiment of the method of the present invention. The first block (30) illustrates the steps involved at the recording studio (30) of a program. An aroma encoding module (33) is included for encoding aroma information into electrical signals from e-nose (34). At the recording studio (30), the module (33) encodes the aroma information into electrical signals that can be analog or digital. The encoding of the aroma information is done in real time during the recording process. In real time in the illustrated embodiment, the aroma signals can be merged into the digital stream (35) with the video and sound during recording and then transmitted via satellite at the broadcast station (40). Video and sound can be captured conventionally. A conventional video recorder can be used to generate video and sound data streams that can be stored on a electronic media in MPEG format. As shown FIG. 1a at the recording studio the images, the sound, and the aroma signals are incorporated into a digital stream (35) that is placed onto some storage medium (37) encoded into a novel MPEG format for electronic transmission at Broadcast Station 40 as shown in FIG. 1. An error correcting technique may be used to ensure the correct delivery of the encoded digital stream (35) to the decoder (50) located in Block 100 in FIG. 2.

The e-nose (34) in FIGS. 1 and 1a is in electronic communication with module (33) and is incorporated into the recording process at recording studio (30). The e-nose (34) captures the aroma scents and encodes the scents into electrical signals for encoding into a digital stream. The electronic nose may consist of two components, (1) an array of chemical sensors which is usually gas sensors and (2) a pattern-recognition algorithm. The sensor array captures the vapors during recording and provides a set of measurement. Gas sensors tend to have very broad selectivity, responding to many different substances and provide real-time odor identification. Alternatively the smell sensors can be made from a quartz crystal with electrical connections and a special plastic coating.

Generally, the time consuming part of the process is the training of the sensor array used to capture the aroma vapors. Once trained e-nose (34) performance is governed by the speed of the chemical sensors and it has the capability to process new smells quickly.

The pattern-recognizer compares the pattern of the measurements from the sensor array to stored patterns for known various aromas. The process of generating digital stream is created using a computer having a processor that is programmed to create the digital stream from the captured measurement pattern generated from the e-nose (34). The chemical sensors of the e-nose is in electronic communication with a processor that generates a measurement pattern. This measurement pattern is utilized to create a digital stream that is represented within a novel protocol transmission format.

Figure 3:
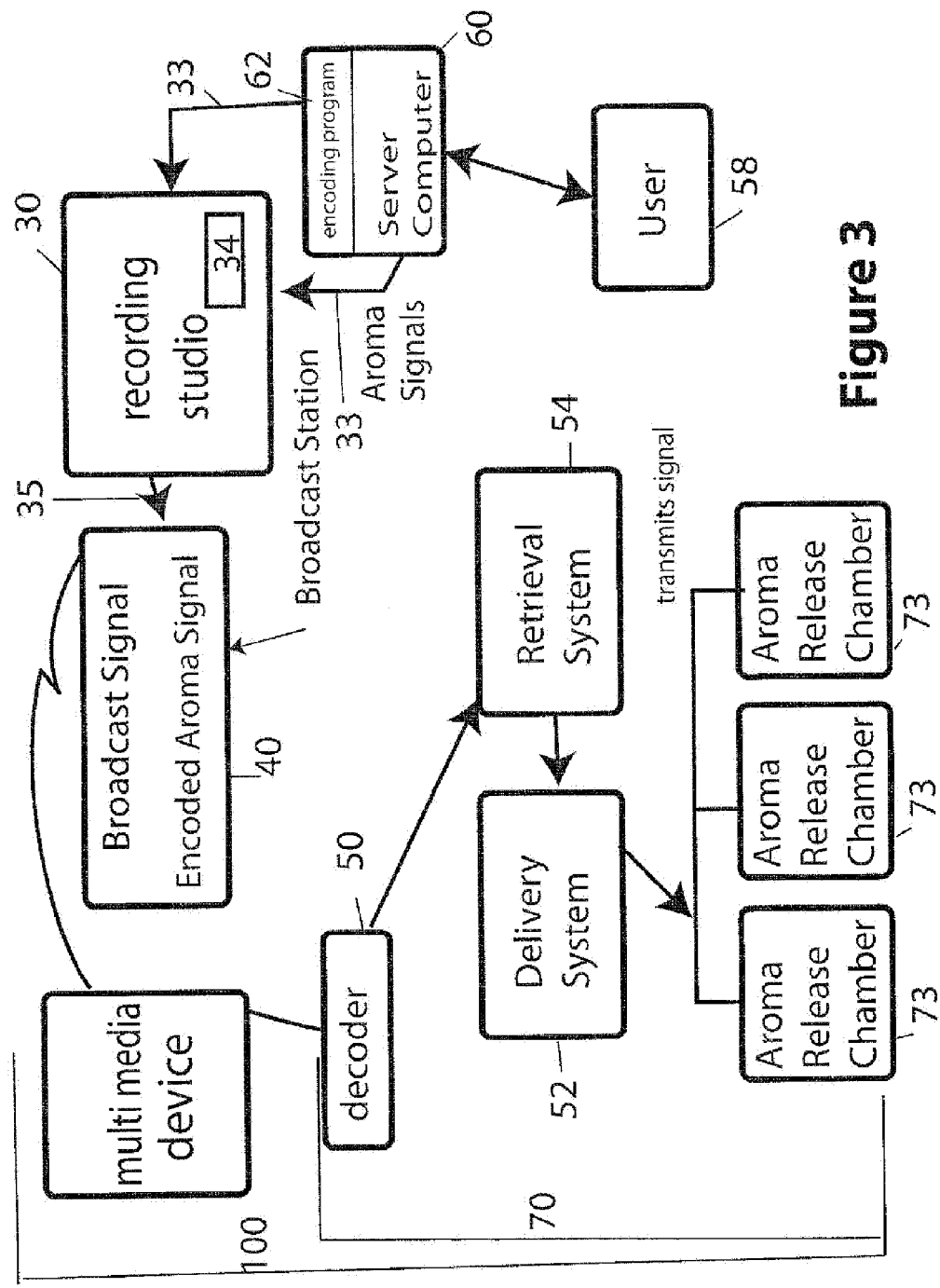
FIG. 3 is a block diagram of the system of the present invention.

After the pattern recognition process, the aroma information may be encoded into a bit stream format and encoded into electrical signals for transmission as shown in FIG. 3. The encoded electrical signals are delivered to a local or remote end user in an analog or digital format viewing the multi-media device as shown in FIG. 3.

As shown in FIG. 1a, after the recording process, the video, digital, and aroma signals are merged into one digital stream (35). The MPEG compression methodology is considered asymmetric as the encoder (37) depicted in FIG. 1a is more complex than the decoder (50) depicted in FIG. 2. The encoder (37) in FIG. 1a needs to be algorithmic or adaptive whereas the decoder (50) is 'dumb' and carries out fixed actions. The MPEG's (ISO's) approach to standardization is novel, because it is not the encoder that is standardized, but the way a decoder interprets the bitstream.

MPEG standardizes the protocol and syntax under which it is possible to combine or multiplex audio data with video data to produce a digital equivalent of a television program. Many such programs can be multiplexed and MPEG defines the way such multiplexes can be created and transported. The definitions include the metadata used by decoders to demultiplex correctly.

In the present invention, MPEG is expanded to include aroma signal data streams. The encoder (37) and decoder (50) have a processor programmed to encode merged video, sound and aroma data stream into a proprietary data code as shown in FIG. 1a.

In the US, generally multiple MPEG programs are combined then sent to a transmitting antenna and an ATSC receiver then decodes the digital stream and displays it.

The digital stream comprises a transport stream that is normally processed by the delivery (52) and retrieval system (54) depicted in FIG. 3. A packet is the basic unit of data in a transport stream (35) depicted in FIG. 2. It starts with a sync byte and a header. Additional optional transport fields, as signaled in the optional adaptation field, may follow. The rest of the packet consists of payload (i.e. aroma, video, and audio formats). Packets can be 188 bytes in length, but the communication medium may add some error correction bytes to the packet. ATSC transmission adds 20 bytes of Reed-Solomon forward error correction to create a packet that is 208 bytes long.

A packet is the basic unit of data in a transport stream. It starts with a sync byte and a header. Additional optional transport fields, as signaled in the optional adaptation field, may follow. The rest of the packet consists of payload. Packets are 188 bytes in length, but the communication medium may add some error correction bytes to the packet. ISDB-T and DVB-T/C/S uses 204 bytes and ATSC 8-VSB, 208 bytes as the size of emission packets (transport stream packet+FEC data). ATSC transmission adds 20 bytes of Reed-Solomon forward error correction to create a packet that is 208 bytes long.

Each table or elementary stream in a transport stream is identified by a 13-bit packet ID (PID). A demultiplexer extracts elementary streams from the transport stream in part by looking for packets identified by the same PID. In most applications, Time-division multiplexing will be used to decide how often a particular PID appears in the transport stream. In the present invention the PID can verify Block 100 in FIG. 1.

Today, the transport stream has a concept of programs. Each single program is described by a Program Map Table (PMT) which has a unique PID, and the elementary streams associated with that program have PIDs listed in the PMT. For example, a transport stream used in digital television might contain three programs, to represent three television channels.

To support the present invention, each channel could consist of one video stream, one or two audio streams, aroma stream and any necessary metadata. As shown in FIG. 3 decoder (50) at the viewer's or user's home wishing to decode a particular "channel" merely has to decode the payloads of each PID associated with its program. It can discard the contents of all other PIDs. To synchronize, the decoder would have to associate the video, aroma, and audio tracks from the elementary streams.

In FIG. 1, the broadcast signal containing the aroma signals embedded within the novel MPEG format is delivered to the home by satellite transmission. However, the broadcast signal can be delivered by radio, cellular, or cable. The digital TV decodes the MPEG signal and displays it just like a computer monitor does, giving it incredible resolution and stability.

Figure 2:
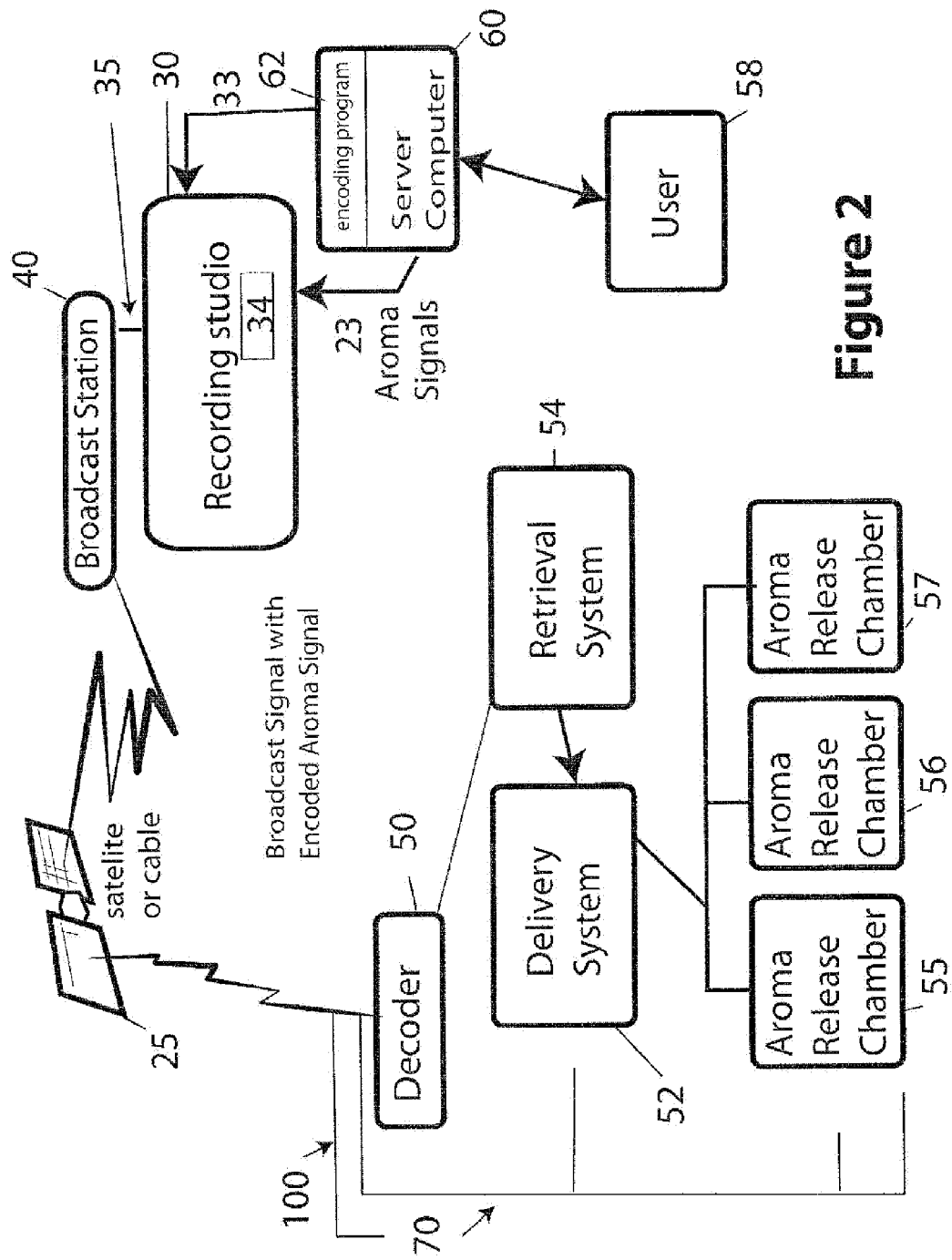
FIG. 2 is a block diagram of the method of the present invention.

Referring to FIG. 3 and FIG. 2, decoder (50) captures the broadcasted electrical signals (25) and sends them to retrieval system (54) which processes the signal and determines the control sequence which controls the aromas emitted by one or more of the aromatic devices contained in chambers 55, 56, 57, and 73. The delivery system (52) send the actual signal to the aroma control unit (80), located in aroma chamber (73) shown in FIGS. 5 and 5.

Figure 4:
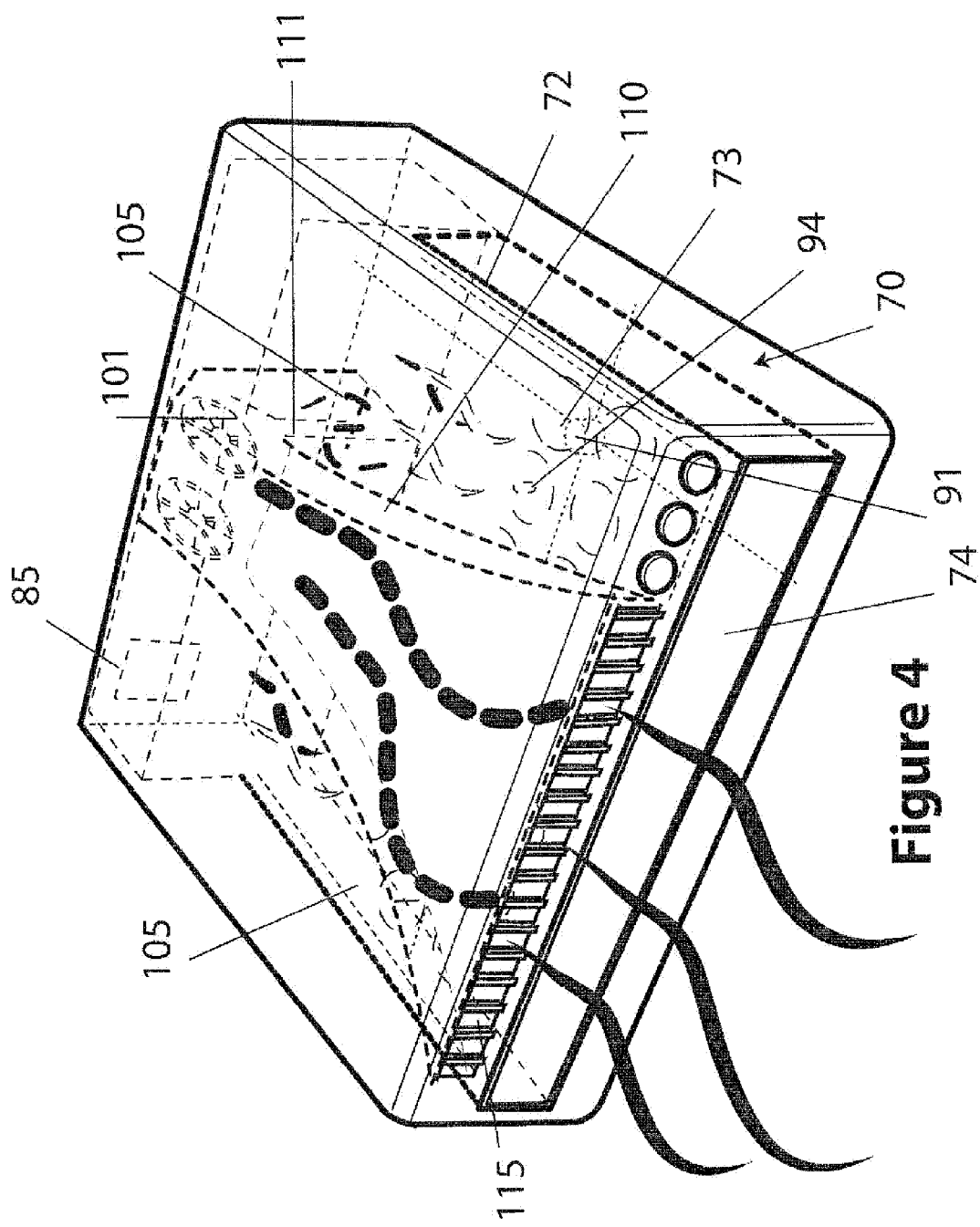
FIG. 4 is a top perspective view of the cassette that holds the aroma chambers.
Figure 5:
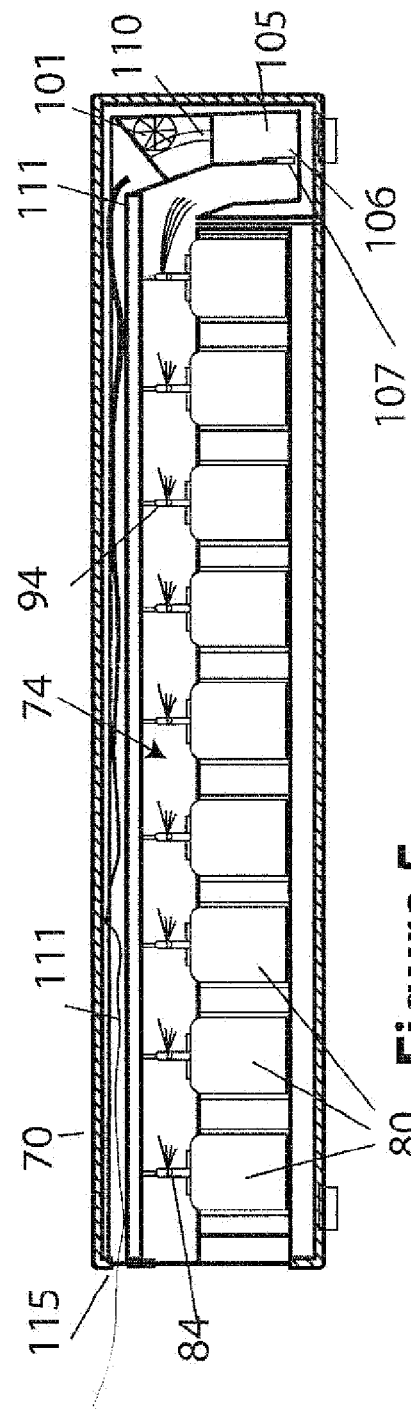
FIG. 5 is a cross-sectional view of the closed aroma chambers.
Figure 5A:
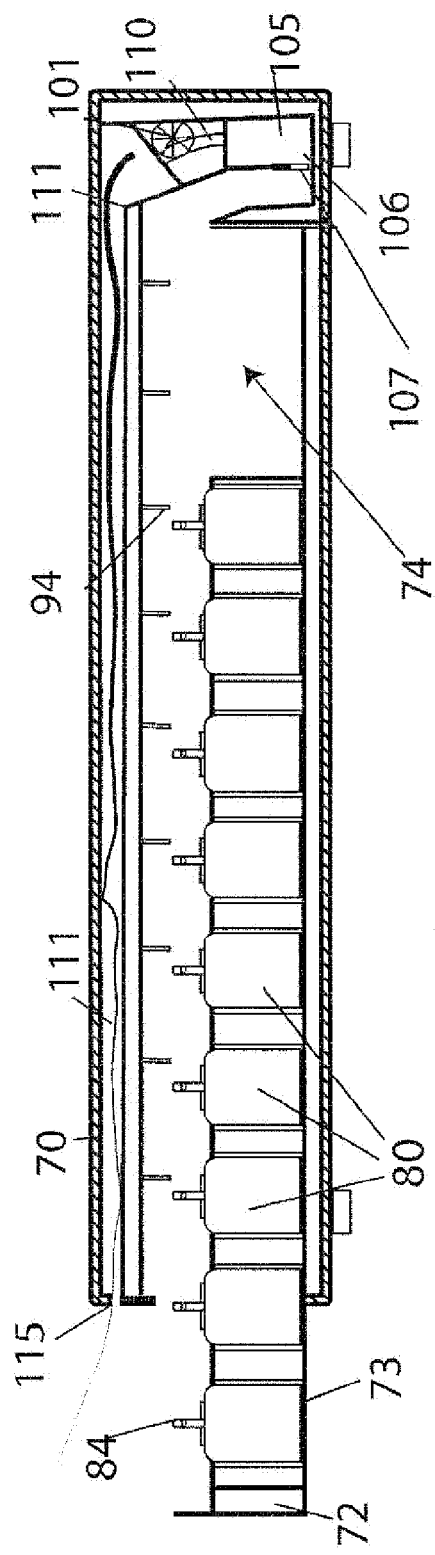
FIG. 5a is a cross-sectional view of the opened aroma chambers.
Figure 8:
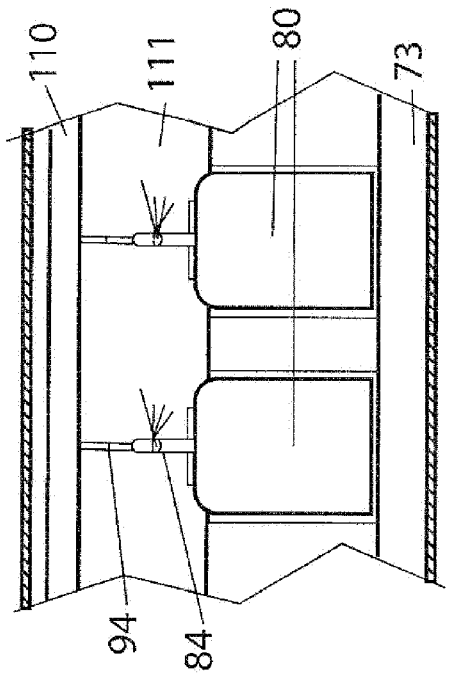
FIG. 8 is an illustrative view of the aroma unit with actuating mechanism
Figure 7:
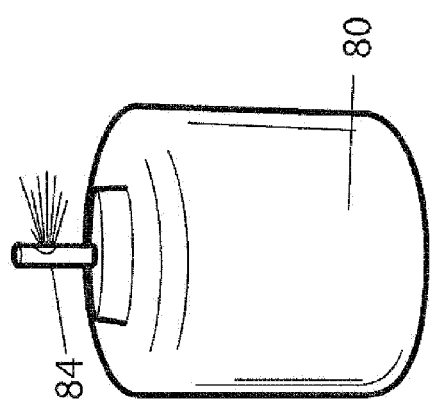
FIG. 7 is a cutaway view of the aroma scent unit.
Figure 9:
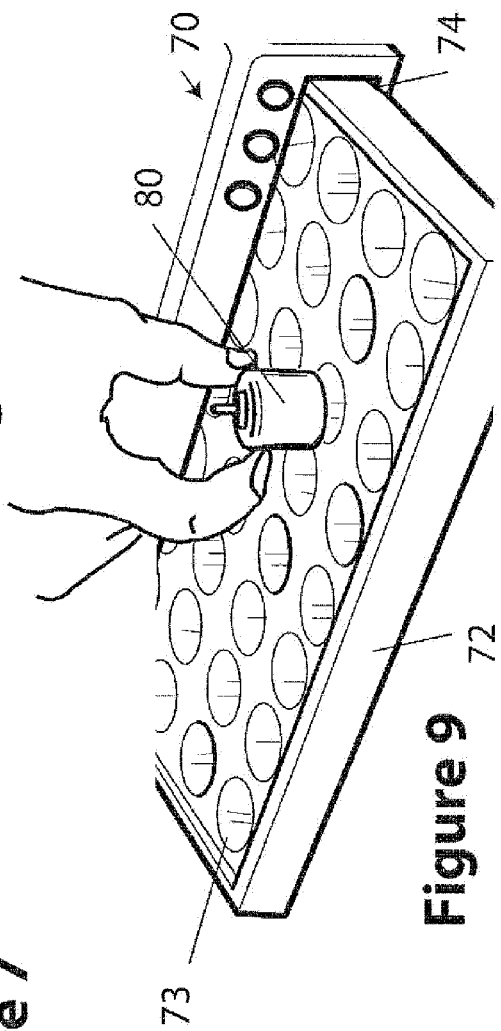
FIG. 9 is a perspective view illustrating the insertion of an aroma unit into chamber.

Referring to FIGS. 4, 5, 6 and 7, an aroma release system comprises a housing unit (70) that has an opening extending into a cavity (74) for receiving tray (72) which contains a plurality of chambers (73) there in. Decoder (50) depicted in FIG. 3 captures the merged data stream from the broadcasted signal and provides the data stream to the retrieval system (54) from the data stream the retrieval system determines the data control sequence and transmits the encoded aroma signal to delivery system (52). Each chamber (73) depicted in FIGS. 5a and 6a contains an aromatic device (80). As depicted in FIG. 3, when a signal is received by decoder (50) it is translated and then sent to retrieval system (54) located within the housing unit (70). The actuator (94,) depicted in FIGS. 5 and 5a and 6a is activated to release the aroma from the aromatic devices (80). However, actuator (94) is not limited to the illustrated embodiment. The control unit (70), decoder (50), retrieval (54) and delivery unit (52) can be implemented within a single or multiple special electronic processing units with its own computer processor.

Referring to FIG. 4, when a program is completed or terminated, an air filtration system (85) can be activated to retrieve or clean the air with aroma from a previously viewed program. The air can be chemically treated and/or sucked through filtering system (85) disposed within the housing unit (70). An air filtration system (85) is provided to remove previously emitted aromas from the air in the surrounding room.

As illustrated in FIG. 3, a processor of the computer system (60) is programmed to encode aroma signals (33). During recording of the aroma signals (33) from the e-nose

(34) patterns depicted in FIG. 1 are transformed into an aroma control sequence that represents particular scenes in a recorded or broadcasted program. Each recorded scene of a program can contain a particular aroma control sequence that has to be synchronized with the video and sound data streams. Referring to FIGS. 1 and 2, in the illustrated embodiment the encoding unit (62) incorporated into computer server (60) interfaces with e-nose (34) and transmits encoded aroma signals to the recording studio (30) for incorporation into the broadcasted signal. In FIG. 3, once the broadcasted signal is transmitted to the viewer, based upon the captured aroma information at block 54, at least one aromatic device (80) is initiated by actuator (94) in response to the decoded aroma control signal.

Referring to FIG. 4, 5 and FIG. 5a, the device comprises a housing unit (70) with a centrally disposed cavity (74) therein. A tray (72) is removably mounted within the centrally disposed cavity (74). A plurality of compartments (73) receives each scent unit (80) and is situated within the tray (72). When tray (72) is placed within housing unit (70), each aroma device is configured to engage with an actuator (94) as shown in FIG. 5a blowing mechanism (101) is located within the cavity (74) at the distal end of the tray (72). The blowing mechanism (101) allows the scents to be dispersed through vents (115) which can be located along the external wall of the housing unit (70) Vents (115) can be located in alternatively on the housing unit (70) frame. Alternatively, upon the termination of a recorded program, filtration unit (85) can disperse a cleaning vapor through vents (115). The cleaning vapor can be contained within filtration unit (85). Alternatively a cleaning vapor can be contained within a scent unit (80) that can be dispersed upon termination of a recorded program.

In the illustrated embodiment, an actuating mechanism (94) is operationally engaged through (84) to emit scent from each scent unit shown in FIG. 5 and FIG. 5a. Referring to FIGS. 5 and 5a, there is shown an illustrated embodiment a depressing actuator (94) that is located within the top portion of the cavity (74). The actuator mechanism is not limited to the systems shown in FIG. 5 and FIG. 5a. When a scent control signal is transmitted, the actuator (94) is activated to emit scent from the scent unit (80) through mechanism (84).

In this invention, a particular aroma can consist of one or more scent units (80) that need to be dispersed one time as shown in FIG. 5. Referring to FIG. 5, in order to accomplish this process, each scent unit (80) would be activated and dispersed into a channel (106) leading into mixing chamber (105) disposed near the depicted distribution chamber (110). When shutter (107) is closed, mixing chamber (105) can be vacuum sealed. When shutter (107) is opened, the scents would be automatically sucked into the chamber (105) for a few seconds to allow combination. Then once the scents are combined in the mixing chamber (105), a blower (101) can be activated to facilitate the dispersing of the aroma through the distribution chamber (110) into dispensing chamber (111) and then through the vents (115) wherein the person viewing the show or movie can now smell the aroma simultaneously while viewing the recorded program. Upon completion of the show or a particular scene, the filtration device (85) can be activated to remove the aroma from the air in preparation of a new scene or program to be viewed by the user.

In alternative embodiments, the recorded program can be stored on a storage media such as a hard drive or a special DVD. A storage media player located within the viewer's home operationally configured to read the storage media containing the synchronized video, sound and aroma data stream would be in communication with the decoder 50 shown in FIG. 3. Decoder 50 would be interfaced directly with the storage media player to receive the data stream that incorporates the aroma data streams for processing. As shown in FIG. 2A in this embodiment, the retrieval system (54) would process, in real time, the aroma data stream from storage media player equivalent to the aroma data stream received from a broadcasted signal and send the processed data to the delivery system (52). In this configuration, there is no communication media, the multi-media device is directly interconnected to the storage media player which is in electronic communication with the aroma data control unit.

Alternatively, the system can be configured without a mixing and dispersing chamber as shown in FIG. 12. In this configuration, the scent unit (80) would contain a premixed scent for dispersing through vents (115).

In this system, as shown in FIG. 2, a non-real time viewer (58) subscriber can access the encoding unit to subscribe to recorded programming containing aroma scent signals. The programmer activates the processor to program encoded aroma signals into a broadcasted signal of a recorded program.

What is claimed is:

1. A method of delivery of aroma signals incorporated into a transmission of a recorded program to be displayed upon a multi-media device, the method comprising:

generating a recording of a video data stream for each scene in the recorded program in a digital format;

generating a recording of a sound data stream that corresponds to video data stream for each scene in the recorded program in a digital format;

capturing the aroma smells through sensors;

based upon the sensors, generating a recording of an aroma data stream that corresponds to both the video data stream and the sound data stream that corresponds to for each scene in the recorded program in a digital format;

synchronizing in real-time the aroma data stream within the video and sound data stream wherein a merged data stream is formed for each scene of the recorded program;

incorporating the merged data stream into an encoded digital transmission protocol wherein an encoded recorded program data stream is formed;

transmitting an electronic signal on a communication medium that represents the encoded recorded program data stream;

retrieving the electronic signal from the communication medium;

decoding the electronic signal into the encoded recorded program data stream;

decoding the aroma data stream from the encoded recorded program data stream;

activating a control device containing a plurality of aroma scent units containing aroma stored as a pressurized gas operationally connected to an actuator;

for each scene in the encoded recorded program data stream transmitting to the control device a data control sequence that represents a real-time aroma embedded therein; and initiating the actuator of selected aroma scent units to release the pressurized gas based upon the data control sequence, synchronizing real-time emission of scents from the plurality of aroma scent units based upon the data control sequence by the control device wherein the viewer senses the aroma while watching the recorded program on a multimedia device.

2. The method of claim 1 wherein the activating step further comprising:
   determining combination of scents that represents an aroma in the scene of the recorded program;
   dispersing the combination of scents from the plurality of scents into an enclosed channel
   transporting each scent within the combination of scents from the enclosed channel into an enclosed mixing chamber within the control device wherein the aroma is formed from the combination of scents; and
   upon mixture of the combination of scents within the enclosed mixing chamber, channeling the aroma scents from the enclosed mixing chamber through a dispersing chamber wherein the aroma is dispersed from the control unit into the atmosphere from the multi-media device.

3. The method of claim 1 further comprising:
   upon completion of the viewing of the recorded program by a user, activating a filtration unit operationally mounded within the control unit wherein the aroma is removed from the atmosphere.

4. The method of claim 3 wherein activating the filtration unit further comprises emitting into to the atmosphere a chemical that neutralizes the aroma.

5. The method of claim 3 wherein activating the filtration unit further comprises retrieving from the atmosphere the aroma wherein the aroma is neutralized.

6. The method of claim 1 wherein generating a recording of an aroma data stream further comprises:
   providing chemical sensors that automatically determine an aroma during recording of the video and sound data stream; and
   generating a measurement pattern based upon in formation captured by the chemical sensors.

7. A system for delivery of aroma signals incorporated into a recorded program to be displayed upon a multi-media device, the system comprising:
   a recorder for generating a video data stream for each in the recorded program;
   a recorder for generating a sound data stream for each scene in the recorded program corresponding to the video data stream;
   means for generating an aroma data stream for the recorded program that corresponds to both the video and the sound data stream;
      means for synchronizing and merging the aroma data stream within the video and sound data stream wherein the video data stream, the sound data stream and the aroma data stream are encoded into to a data stream of the recorded program;
      means for transmitting the encoded data stream of the recorded program onto a communication medium in a data transmission protocol format;
      means for capturing the encoded data stream for the communication medium; means for generating a data control sequence that represents an aroma in a scene of the recorded program based upon the encoded data stream captured by the retrieving unit;
   means for storing a plurality of aroma scents wherein each scent is stored in a pressurized container
   means for electronically releasing a combination of aroma scents from the plurality of scents into to an enclosed channel wherein the combination of scents is transported into to an enclosed mixing chamber: and
   means for transmitting the data control sequence to a particular aroma scent unit designated in the control sequence wherein the aroma of the scene is recreated in real-time while the viewer is watching the recorded program on the multi-media device.

8. The system of claim 6 further comprising:
   upon completion of the viewing of the recorded program by a user, means for the activating a filtration unit that is operationally mounted within the control unit wherein the aroma is removed from the atmosphere.

9. The system of claim 6 further comprising:
   chemical sensors that automatically determine an aroma during recording of the video and sound data stream;
   means for generating a measurement pattern based upon information captured by the chemical sensors; and
   means for generating the aroma data stream based upon the measurement pattern.

* * * * *